United States Patent
Nakano et al.

(10) Patent No.: US 8,861,101 B2
(45) Date of Patent: Oct. 14, 2014

(54) LENS-MOUNTING STRUCTURE, AND OPTICAL-SCANNING APPARATUS AND IMAGE-FORMING APPARATUS EQUIPPED WITH THE SAME

(75) Inventors: Issei Nakano, Osaka (JP); Chika Sawamoto, Osaka (JP)

(73) Assignee: Kyocera Document Solutions Inc., Osaka-shi (JP)

( * ) Notice: Subject to any disclaimer, the term of this patent is extended or adjusted under 35 U.S.C. 154(b) by 92 days.

(21) Appl. No.: 13/090,812

(22) Filed: Apr. 20, 2011

(65) Prior Publication Data

US 2011/0268476 A1 Nov. 3, 2011

(30) Foreign Application Priority Data

Apr. 28, 2010 (JP) ................. 2010-103012

(51) Int. Cl.
*G02B 7/02* (2006.01)
*G02B 26/12* (2006.01)
*G03G 15/04* (2006.01)

(52) U.S. Cl.
CPC .............. *G02B 26/125* (2013.01); *G02B 7/025* (2013.01); *G03G 15/04072* (2013.01); *G03G 2215/0404* (2013.01)
USPC .......................................... 359/819; 359/820

(58) Field of Classification Search
USPC ................... 359/819, 820, 618–620
See application file for complete search history.

(56) References Cited

U.S. PATENT DOCUMENTS

| 6,919,996 | B2 * | 7/2005 | Wada et al. ................... 359/719 |
| 6,985,312 | B2 * | 1/2006 | Yamakawa et al. ........... 359/819 |
| 2005/0067681 | A1 * | 3/2005 | De Villeneuve et al. ...... 257/678 |
| 2006/0033984 | A1 * | 2/2006 | Bruynooghe et al. ........ 359/350 |

FOREIGN PATENT DOCUMENTS

| JP | 7-175000 A | 7/1995 |
| JP | 2005-352283 AA | 12/2005 |

OTHER PUBLICATIONS

Office Action for JP Application No. 2010-103012, mailed Sep. 12, 2012.
English Machine Translation for JP 2005-352283.

* cited by examiner

*Primary Examiner* — Alicia M Harrington
(74) *Attorney, Agent, or Firm* — Knobbe Martens Olson & Bear LLP

(57) ABSTRACT

A lens-mounting structure according to the present invention is a lens mounting structure that glues a lens and a mounting surface of a support portion that supports the lens using an adhesive agent applied there between, to mount the lens to the support portion, characterized by setting a gluing surface area of the mounting surface of the support portion and the adhesive agent to be smaller than a gluing surface area of the lens and the adhesive agent.

4 Claims, 8 Drawing Sheets

FIG. 7A  CONVENTIONAL
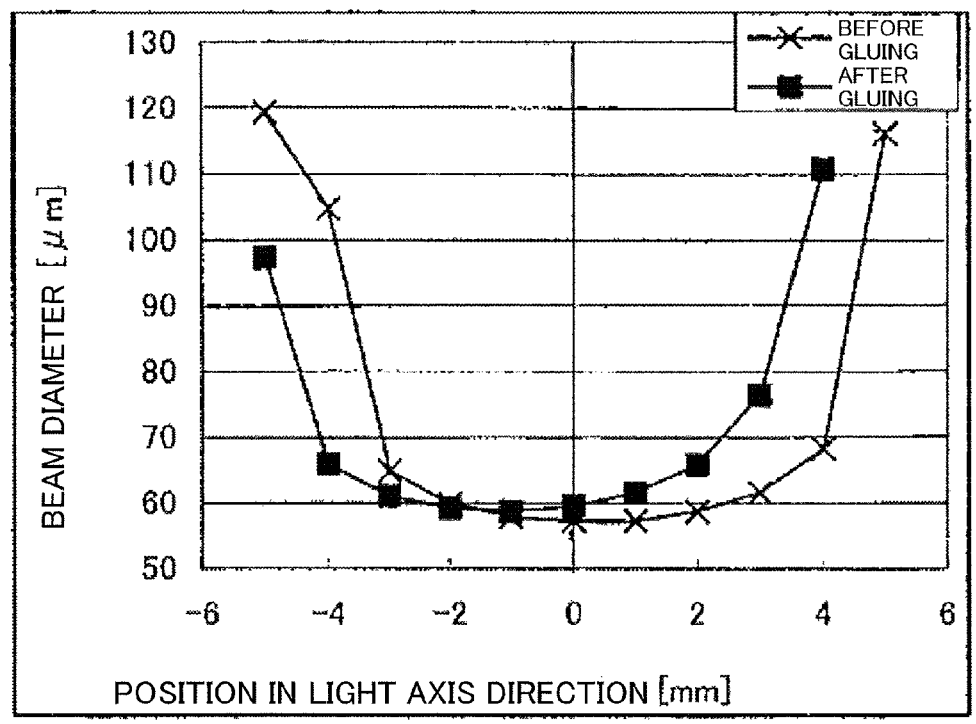
FIG. 7B  THE PRESENT INVENTION
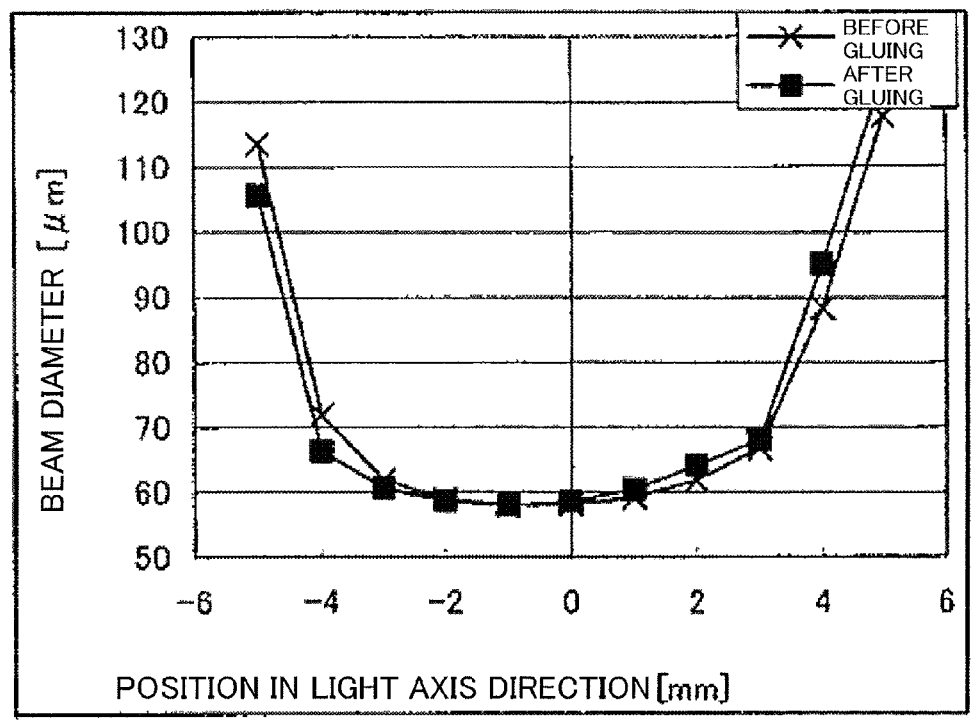

LENS-MOUNTING STRUCTURE, AND OPTICAL-SCANNING APPARATUS AND IMAGE-FORMING APPARATUS EQUIPPED WITH THE SAME

This application is based on and claims the benefit of priority from Japanese Patent Application No. 2010-103012, filed on 28 Apr. 2010, the content of which is incorporated herein by reference.

BACKGROUND OF THE INVENTION

1. Field of the Invention

The present invention relates to a lens-mounting structure that mounts a lens to a support portion using an adhesive agent, an optical-scanning apparatus that optically scans an image carrier, and an image-forming apparatus such as a copier, or printer and the like.

2. Related Art

In an image-forming apparatus such as a copier or printer and the like, an image carrier uniformly electrostatically charged by a charging device is optically scanned by an optical-scanning apparatus to form on a surface of the image carrier an electrostatic latent image that corresponds to image information.

Here, the optical-scanning apparatus is composed of a scanning optical system, installed in a frame, equipped with a deflector, such as a polygon mirror that deflects a light beam radiated from a light source, a scanning lens such as an fθ lens that converts the light beam deflected by the deflector into constant speed scanning light, and a plurality of reflective mirrors that guide the constant speed scanning light back onto a photoreceptor.

In this optical-scanning apparatus, a scanning lens is attached and installed in a housing support portion by adhesive. However, a problem existed in that desired optical characteristics could not be attained because of changes in a lens position caused by lens displacement associated with shrinkage that occurs because of adhesive agent hardening.

A lens-mounting structure has been proposed to reduce lens mounting direction displacement that occurs when the adhesive agent contracts, by forming a projection on a top surface of a support column of a mounting base and supporting the lens on the projection, and gluing a surface of the projection, and the peripheral portion of the contact portion with the top surface of the support column post and projection on the lens.

SUMMARY OF THE INVENTION

However, with the lens-mounting structure described above, attention was only paid to changes in lens orientation; measures were not implemented for stress that develops in the lens caused by contraction associated with adhesive agent hardening. For that reason, when the adhesive agent hardens, stress is generated in locations where the projection of the support column and the lens touch, so it is not possible to prevent the problem of changes in lens refractive index caused by hardening of optical elasticity. Localized changes in the lens refractive index occur only near the locations where the projection of the support column and lens touch. For that reason, localized changes occur in the imaging position of the light beam on the image carrier, so high-precision exposure scanning on the image carrier is not attained. This results in the problem of the system not obtaining high-quality images.

An object of the present invention is to provide a lens-mounting structure that reduces changes in lens orientation and stress developed with a lens, and maintains high-optical lens characteristics, an optical-scanning apparatus capable of attaining high-precision optical scanning and an image-forming apparatus that attains stable, and high-quality images.

The present invention includes; a lens mounting structure that glues a lens and a mounting surface of a support portion that supports the lens using an adhesive agent applied therebetween, to mount the lens to the support portion, characterized by setting a gluing surface area of the mounting surface of the support portion and the adhesive agent to be smaller than a gluing surface area of the lens and the adhesive agent.

The present invention sets a gluing surface area for the support portion mounting surface and adhesive agent to be smaller than the gluing surface area of a lens and adhesive agent. For that reason, it is possible to reduce stress that develops near the lens support portion mounting surface that is caused by adhesive contraction that is associated with adhesive agent hardening. Furthermore, the present invention prevents localized changes in the lens refractive index caused by optical elasticity and changes in lens orientation, which ensures high-optical characteristics of the lens.

BRIEF DESCRIPTION OF THE DRAWINGS

FIG. 7A is a graph showing changes in a light beam diameter, before and after gluing, that passes near a lens base level, in a conventional lens-mounting structure, with regard to a position in a light axis direction;

FIG. 7B is a graph showing changes in an light beam diameter, before and after gluing, that passes near a lens base level, in the lens-mounting structure according to the present invention, with regard to a position in a light axis direction;

DETAILED DESCRIPTION OF THE INVENTION

Preferred embodiments of the present invention will now be described based on the drawings provided.
[Image-Forming Apparatus]

Figure 1:
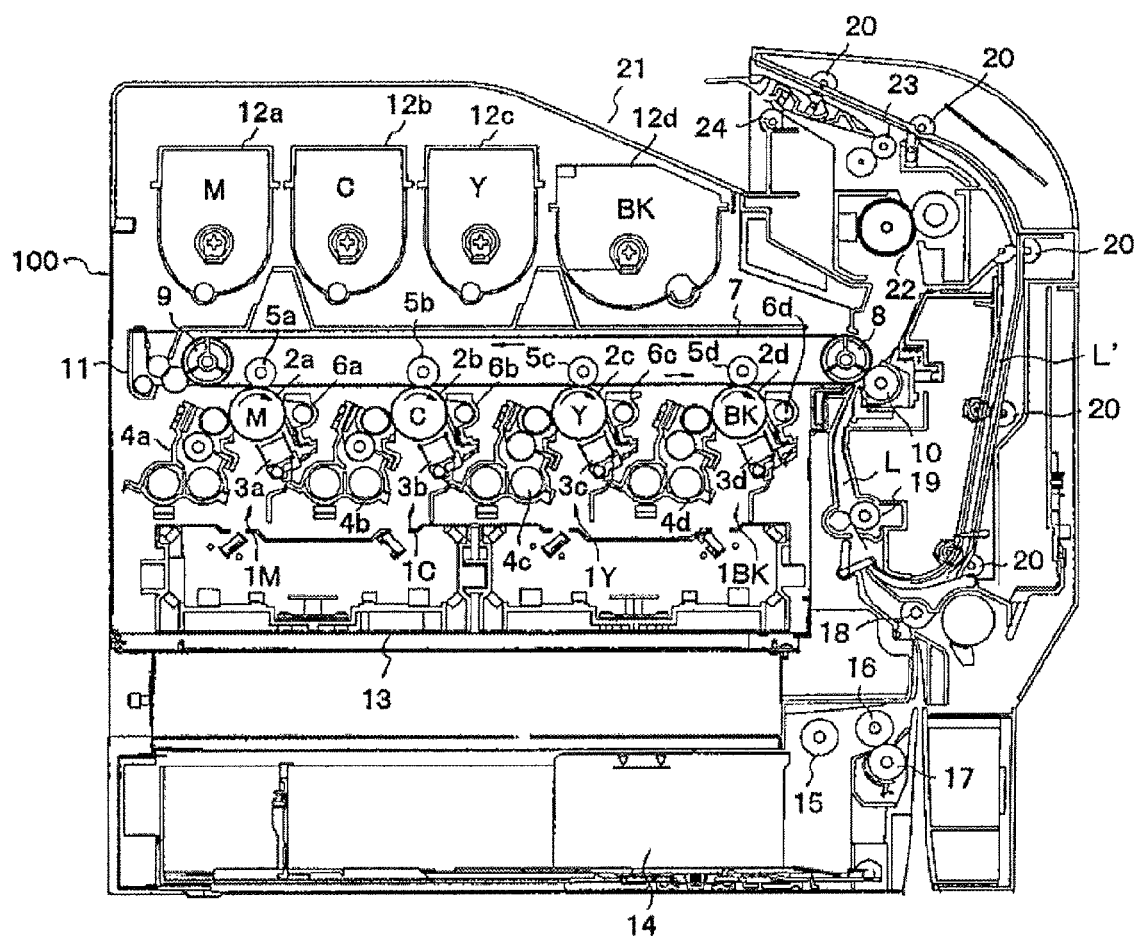
FIG. 1 is a lateral sectional view of an image-forming apparatus (color-laser printer) according to an embodiment of the present invention.

FIG. 1 is a lateral sectional view of a color-laser printer as one embodiment of an image-forming apparatus according to the present invention. The color-laser printer depicted in the drawing is a tandem-type apparatus. A magenta-image-forming unit 1M, a cyan-image-forming unit 1C, a yellow-image-forming unit 1Y, and a black-image-forming unit 1BK are disposed in tandem at regular spacings in a central location of a main unit 100 of the color-laser printer.

Photosensitive drums 2a, 2b, 2c, and 2d that are image carriers are each disposed at each image-forming units 1M, 1C, 1Y, and 1BK. Charging devices 3a, 3b, 3c, and 3d, developing devices 4a, 4b, 4c, and 4d, transfer rollers 5a, 5b, 5c, and 5d, and drum cleaning devices 6a, 6b, 6c, and 6d are each disposed in areas around each of the photosensitive drums 2a, 2b, 2c and 2d.

Here, the photosensitive drums 2a, 2b, 2c and 2d are drum-shaped photoreceptors. They are rotationally driven by a drive motor, not shown, at a predetermined processing speed in a direction of arrows (clockwise direction) in the drawing. Also, the charging devices 3a-3d uniformly charge a surface of the photosensitive drums 2a-2d to a predetermined potential using a charged bias charged from charging bias power supply, not shown.

Furthermore, the developers 4a-4d contain magenta (M) toner, cyan (C) toner, yellow (Y) toner, and black (BK) toner. The developers 4a-4d adhere a toner of each color to each electrostatic latent image formed onto each of the photosensitive drums 2a-2d to visually develop each electrostatic latent image as a toner image of each color.

Also, the transfer rollers 5a-5d are disposed to be able to touch the photosensitive drums 2a-2d interposed by an intermediate transfer belt 7, at each primary transfer unit. The intermediate transfer belt 7 is trained between a drive roller 8 and tension roller 9, and disposed to be able to travel at an upper surface side of photosensitive drums 2a-2d. The drive roller 8 is disposed to be able to touch a secondary transfer roller 10 interposed by an intermediate transfer belt 7, at a secondary transfer unit. Also, a belt cleaning device 11 is established near the tension roller 9.

Toner containers 12a, 12b, 12c, and 12d are disposed in parallel in a line to refill toner to each developer 4a-4d, above each image-forming unit 1M, 1C, 1Y, and 1BK in the printer main unit 100.

Also, two optical scanning apparatuses 13 are disposed in parallel to a paper conveyance direction below each image-forming unit 1M, 1C, 1Y, and 1BK in the printer main unit 100. A paper cassette 14 is detachably disposed in the printer main unit 100, at a bottom portion of the printer main unit 100 which is a bottom side of the optical scanning apparatus 13. A plurality of sheets of paper, not shown, is stacked and stored in the paper cassette 14. A pickup roller 15 that kicks out paper from the paper cassette 14, a feed roller 16 and a retard roller 17 that separate kicked out paper and feed one sheet of paper at a time to a conveyance path L are disposed near the paper cassette 14.

Also, a conveyance roller pair 18 that conveys paper and a resist roller pair 19 are disposed in the conveyance path L that extends in up and down directions of the printer main unit 100. The resist roller pair 19 supplies paper at a predetermined timing after having made the paper to temporarily standby, to the secondary transfer unit which is a touching portion of the secondary transfer roller pair 8 and secondary transfer roller 10. A separate conveyance path L' is formed next to the conveyance path L, to be used when forming images on both sides of paper. A plurality of turn-over roller pairs 20 is disposed at appropriate intervals in a conveyance path L'.

However, the conveyance path L disposed in a longitudinal direction at one side of the printer main unit 100 extends up to a discharge tray 21 established at a top surface of the printer main unit 100. A fixing device 22 and discharge roller pair 23, 24 are established partway in the conveyance path L.

Image-forming operations using a color-laser printer having the configuration above will now be described.

When an image-forming starting signal is issued, each photosensitive drum 2a-2d is rotationally driven at a predetermined processing speed in a direction of arrows (clockwise direction) shown in the drawing, in each image-forming unit 1M, 1C, 1Y, and 1BK. These photosensitive drums 2a-2d are uniformly charged by the charging devices 3a-3d. Furthermore, each optical-scanning apparatus 13 emits a light beam modulated according to a color image signal of each color to irradiate the light beams onto a surface of each photosensitive drum 2a-2d thereby forming on each photosensitive drum 2a-2d an electrostatic latent image that corresponds to a color-image signal of each color.

First, the developer 4a charged with a developer bias having the same polarity as the charged polarity of the photosensitive drum 2a attaches magenta toner to an electrostatic latent image formed on the photosensitive drum 2a in the magenta image-forming unit 1M. This visually develops the electrostatic latent image as a magenta toner image. This magenta toner image is primarily transferred at the primary transfer unit (transfer nipping portion) between the photosensitive drum 2a and transfer roller 5a onto the intermediate transfer belt 7 rotationally driven in a direction of the arrows in the drawing, by an action of the transfer roller 5a charged with a primary transfer bias of a polarity opposite to that of the toner.

Next, the intermediate transfer belt 7 onto which the magenta toner image is primarily transferred as described above moves to the cyan image-forming unit 1C. Then, at the cyan image-forming unit 1C, in the same way as described above, the cyan toner image formed on the photosensitive drum 2b is transferred onto the intermediate transfer belt 7 overlapping the magenta toner image at the primary transfer unit.

Below, in the same way, yellow and black toner images each formed on photosensitive drums 2c and 2d of the yellow and black image-forming units 1Y and 1BK are formed sequentially overlapping magenta and cyan toner images on the intermediate transfer belt 7. In this way, a full-color toner image is formed on the intermediate transfer belt 7. Residual transfer toner on each photosensitive drum 2a-2d that is not transferred to the intermediate transfer belt 7 is removed by each drum cleaning device 6a-6d. Then, each photosensitive drum 2a-2d is ready for forming a next image.

Paper is then fed from the paper cassette 14 to the conveyance path L by the pickup roller 15, the feed roller 16 and the retard roller 17, to match a timing for the leading edge of a full-color toner image on the intermediate transfer belt 7 to reach the secondary transfer position (the nipping portion) between the drive roller 8 and the secondary transfer roller 10. Also, paper is conveyed by the resist roller pair 19 to the secondary transfer portion. Then, the full-color toner image is secondarily transferred at one time from the intermediate transfer belt 7 to the paper conveyed to the secondary transfer position, by secondary transfer roller 10 that is charged with a secondary transfer bias having a polarity opposite to that of the toner.

In this way, paper transferred with the full-color toner image is conveyed to the fixing device 22. The full-color toner image is heated and compressed thereby being heat-fused to a surface of the paper. Paper onto which the toner image is fixed is then discharged by discharge roller pair 23, 24 to the discharge tray 21. This completes a series of image-forming operations. Residual transfer toner on the intermediate transfer belt 7 that is not transferred to paper is removed by the belt cleaning device 11. With this, the intermediate transfer belt 7 is ready for forming a next image.

[Optical-Scanning Apparatus]

The optical-scanning apparatus 13 according to the present invention will now be explained with reference to FIG. 2.

Figure 2:
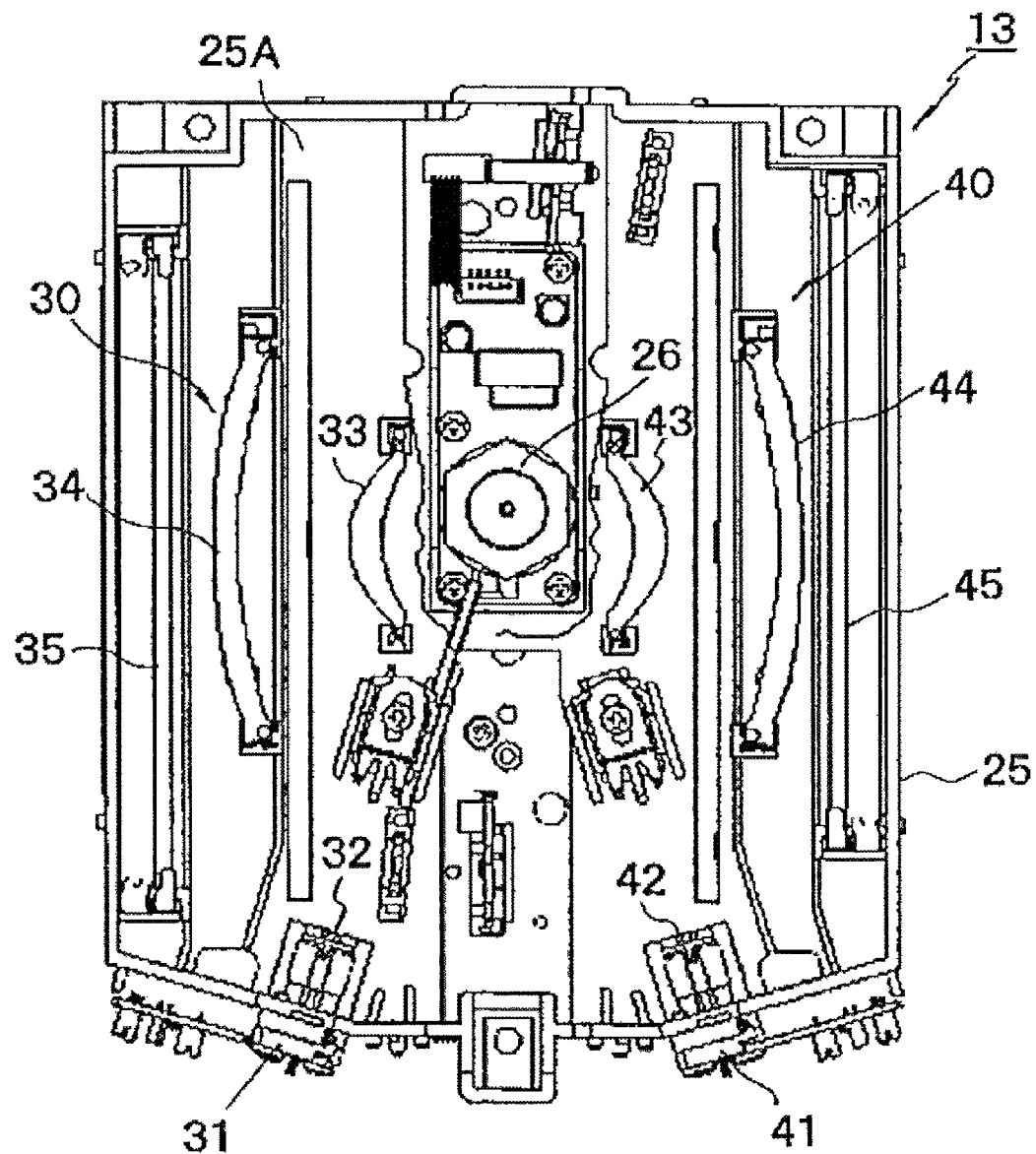
FIG. 2 is a plan view showing a cover of the optical-scanning apparatus according to the present invention, removed.

FIG. 2 is a plan view showing a cover of the optical-scanning apparatus according to the present invention, removed. As shown in FIG. 1, two optical-scanning apparatuses 13, shown in FIG. 2, are juxtaposed in the color-laser printer shown in FIG. 1. However, because both apparatuses have the same configuration, only one optical-scanning apparatus 13 will be described.

The optical-scanning apparatus 13 has a frame 25 formed into one body using resin. An inside of the frame 25 is sectioned into a top and a bottom by a horizontal partition plate 25A. Also, a polygon mirror 26, which is a deflector, is disposed at a central portion in a width direction (left and right directions of FIG. 2) of a top surface of the partition plate 25A of the frame 25. Two scanning-optical systems 30, 40, are disposed in the frame 25 symmetrically on both sides thereof, centering on the polygon mirror 26. Also, a pair of laser diodes 31, 41 that is a light source that corresponds to the scanning-optical systems 30, 40, and a pair of cylindrical lenses 32, 42 are each disposed at a left and a right side of a top portion of the partition plate 25A of the frame 25, with a central line in a width direction as a boundary.

At a top surface of the partition plate 25A of the frame 25, each of the scanning-optical systems 30, 40 is equipped with first-imaging lenses 33, 43, second-imaging lenses 34, 44 and first-reflective mirrors 35, 45, disposed along a light beam advancing direction. At a bottom surface of the partition plate 25A, each of the scanning-optical systems 30, 40 is equipped with a second reflective mirror and a third reflective mirror, not shown, disposed along the light beam advancing direction.

Also, light beam that is emitted from laser diodes 31, 41 disposed in each scanning-optical system 30, 40, in one optical-scanning apparatus 13 is incident from two symmetrical directions onto the polygon mirror 26 that is rotationally driven, after being converged into a linear luminous flux by cylindrical lenses 32, 42.

Each light beam incident to the polygon mirror 26 as described above is converted into constant speed scanning light by passing through the first-imaging lenses 33, 43 and the second-imaging lenses 34, 44, after being deflected by the polygon mirror 26. Also, the constant speed scanning light is reflected back at a right angle toward a downward direction by the first reflective mirrors 35, 45, reaches the second reflective mirror, not shown, passing through an aperture, not shown, formed in partition plate 25A; the constant speed scanning light is then reflected back at a right angle by the second reflective mirror to advance horizontally along a bottom surface of the partition plate 25A. Then, the constant speed scanning light is reflected back at a right angle by the third reflective mirror, not shown, and passes through an aperture, not shown, formed in a cover that covers a top surface of the partition plate 25A and the frame 25. Also, the constant speed scanning light is directed toward the photosensitive drums 2a, 2b (see FIG. 1) and scans to expose the photosensitive drums 2a, 2b.

As shown in FIG. 2, one optical-scanning apparatus 13 scans to expose the photosensitive drum 2a of the magenta-image forming unit 1M and the photosensitive drum 2b of the cyan-image forming unit 1C shown in FIG. 1. Two optical-scanning apparatuses 13 having the same configuration as that described above are juxtaposed in the color-laser printer main unit 100 shown in FIG. 1. These two optical-scanning apparatuses 13 scan to expose all four photosensitive drums 2a-2d including the photosensitive drum 2c of the yellow-image forming unit 1Y and the photosensitive drum 2d of the black-image forming unit 1BK to a light beam.

[Lens-Mounting Structure]

Next, an embodiment of a mounting structure for the first-imaging lens 33 as the lens-mounting structure according to the present invention will be explained. Note that the mounting structures for both first-imaging lens 33, 43 are the same. Therefore, only the first-imaging lens 33 mounting structure will be explained.

First Embodiment

Figure 3:
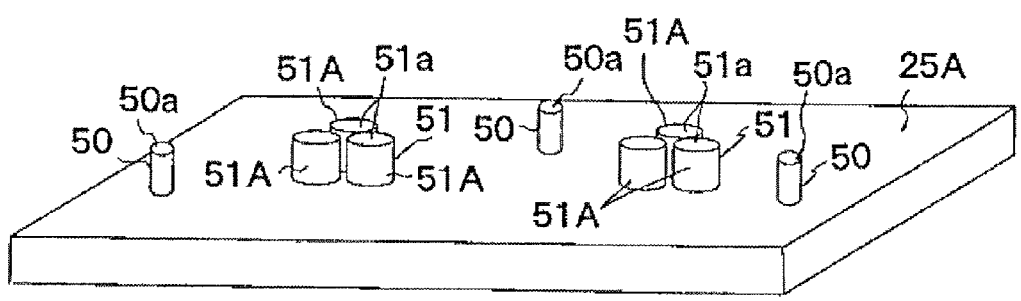
FIG. 3 is a fragmentary perspective view of an optical-scanning apparatus frame that composes a lens-mounting structure according to a first embodiment of the present invention.
Figure 4:
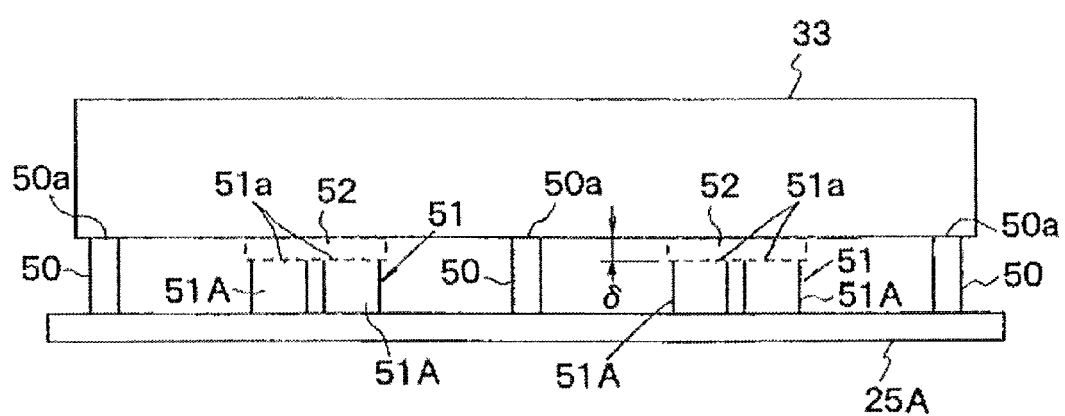
FIG. 4 is a lateral view showing the lens-mounting structure according to the first embodiment of the present invention.
Figure 5:
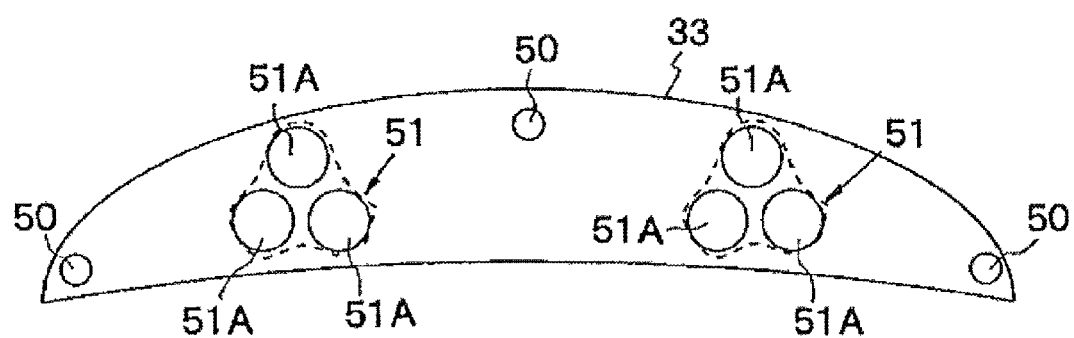
FIG. 5 is a plan view of a first-imaging lens that composes the lens-mounting structure according to the first embodiment of the present invention.
Figure 6:
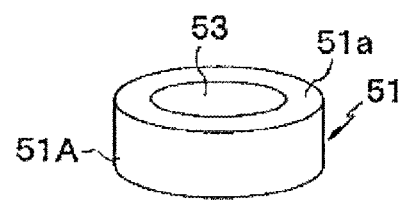
FIG. 6 is a perspective view showing a different configuration of the support portion that composes the lens-mounting structure according to the first embodiment of the present invention.

FIG. 3 is a fragmentary perspective view of an optical-scanning apparatus frame that composes a lens-mounting structure according to a first embodiment of the present invention. FIG. 4 is a lateral view showing the lens-mounting structure according to the first embodiment of the present invention. FIG. 5 is a plan view of the first-imaging lens that composes the lens-mounting structure according to the first embodiment of the present invention. FIG. 6 is a perspective view showing different configurations of the support portion that composes the lens-mounting structure according to the first embodiment of the present invention.

Three cylindrical positioning projections 50 are vertically arranged, as shown in FIG. 3, on a top surface of the partition plate 25A on the frame 25 of the optical-scanning apparatus 13 shown in FIG. 2. Two sets of support portions 51, one set thereof composed of three vertically arranged cylindrical projections 51A, are disposed between these positioning projections 50.

Also, as shown in FIG. 4, the first-imaging lens (hereinafter simply referred to as lens) 33 is placed horizontally on these three positioning projections 50. The lens 33 is mounted to the frame 25 by gluing two locations of a bottom surface of the lens to a top surface of the two sets of support portions 51 using adhesive agent 52. A top surface of each positioning projection 50 (surface that touches the lens) composes a reference surfaces 50a. A top surface of each of the three cylindrical projections 51A, which compose each support portion 51, composes a mounting surface 51a. Heights of these cylindrical projections 51A are set to be lower than heights of each positioning projection 50, by an application thickness ($\delta$) of the adhesive agent 52. Note that for the adhesive agent 52, a photo-curable resin is used.

Here, as shown in FIG. 5, each of the three cylindrical projections 51A that compose the two sets of support portions 51 is disposed at each apex of an equilateral triangle in a plan view. The gluing surface area (the sum of the surface areas of the mounting surfaces 51a of each of the three cylindrical projections 51A) of the mounting surface 51a of each support portion 51 and the adhesive agent 52 is set to be smaller than the gluing surface area of the lens 33 and the adhesive agent 52, shown with the dashed line in FIG. 5. More specifically, if a surface area of the mounting surface 51a of the three cylindrical projections 51A of each support portion 51 is S1, and a gluing surface area of the lens 33 and adhesive agent 52 is S, the following relationship is established.

$$3 \times S1 < S \quad (1)$$

Note that as another configuration that satisfies the above relationship (1), it is acceptable to compose each support portion 51 as one cylindrical projection 51A, and to form a circular hole 53 in the mounting surface 51a of the cylindrical projection 51A, as shown in FIG. 6.

In this way, with this embodiment, the gluing surface area of the mounting surface 51a of the support portion 51 and the adhesive agent, as described above, is set to be smaller than the gluing surface area of the lens 33 and adhesive agent 52. For that reason, stress is reduced that developed near the mounting surfaces 51a of each support portion 51 (near each mounting surface 51a of the three cylindrical projections 51) of the lens caused by shrinkage associated with hardening of the adhesive agent 52. Also, localized refractive index changes of the lens 33 and orientation changes of the lens 33 caused by optical elasticity are prevented and high-optical characteristics of the lens 33 are ensured. The result is that problems such as localized changes in the light beam imaging position on the photosensitive drums 2a, 2b (see FIG. 1) using the optical-scanning apparatus 13 shown in FIG. 2 do not occur. Furthermore, high-precision optical scanning of photosensitive drums 2a, 2b is possible. For that reason, problems such as an image being out of color registration do not occur in the color-laser printer shown in FIG. 1 that is equipped with two of such optical-scanning apparatuses 13. Therefore, high-quality, full-color images can be obtained in a stable manner.

FIG. 7A is a graph showing changes in a light beam diameter [μm], before and after gluing, that passes near a lens base level, in a conventional lens-mounting structure, with regard to position [mm] in a light axis direction; FIG. 7B is a graph showing changes in an light beam diameter [μm], before and after gluing, that passes near a lens base level, in the lens-mounting structure according to the present invention, with regard to position [mm] in a light axis direction.

According to results, shown in FIG. 7A, of using the conventional lens-mounting structure, lens stress caused by adhesive hardening and shrinkage is not reduced; changes occurred in the imaging position before and after the lens is glued. According to results, shown in FIG. 7B, of using the lens-mounting structure according to the present invention, lens 33 stress caused by adhesive 52 hardening and shrinkage is adequately reduced, so no change occur in the imaging position before and after the lens is glued. In this way, the effect of this invention is verified.

Second Embodiment

Next, a second embodiment of the lens-mounting structure according to the present invention will now be described.

Figure 8:
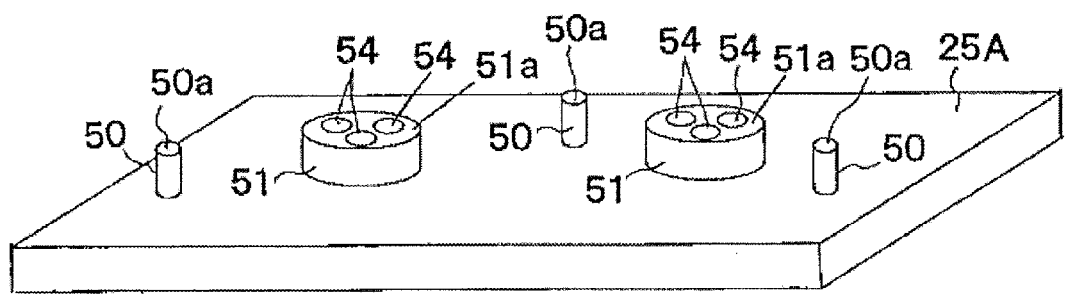
FIG. 8 is a fragmentary perspective view of an optical-scanning apparatus frame that composes a lens-mounting structure according to a second embodiment of the present invention.
Figure 9:
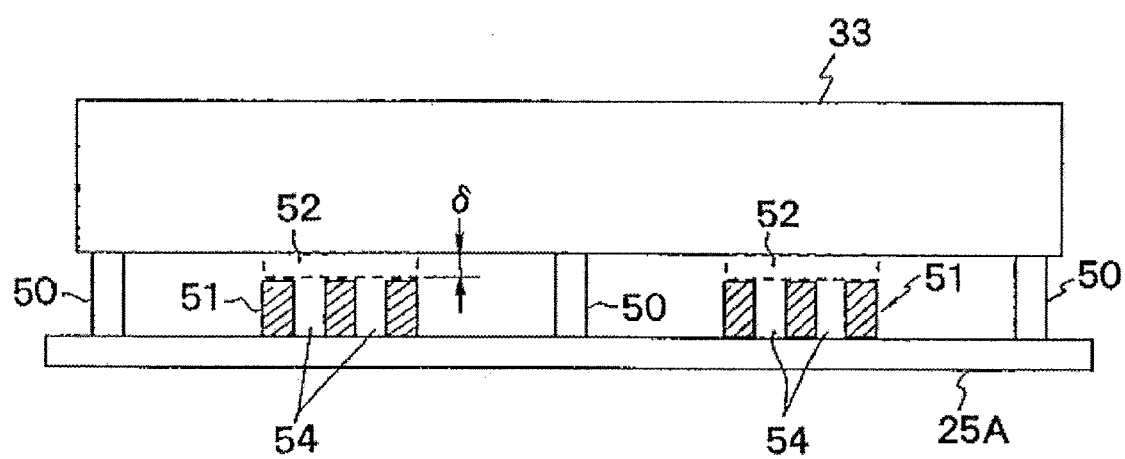
FIG. 9 is a lateral view showing the lens-mounting structure according to the second embodiment of the present invention.
Figure 10:
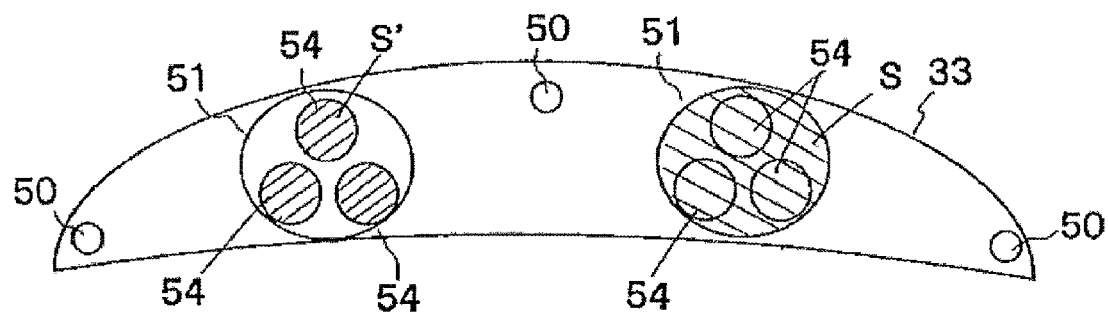
FIG. 10 is a plan view of a first-imaging lens that composes the lens-mounting structure according to the second embodiment of the present invention.
Figure 11A:
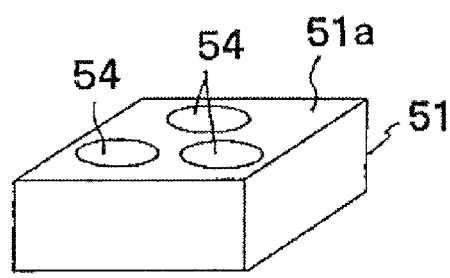
FIGS. 11A and 11B are perspective views showing different configurations of the support portion that composes the lens-mounting structure according to the second embodiment of the present invention.
Figure 11B:
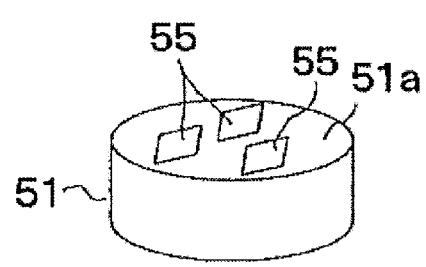

FIG. 8 is a fragmentary perspective view of an optical-scanning apparatus frame that composes a lens-mounting structure according to a second embodiment of the present invention. FIG. 9 is a lateral view showing the lens-mounting structure according to the second embodiment of the present invention. FIG. 10 is a plan view of the first-imaging lens that composes the lens-mounting structure according to the second embodiment of the present invention. FIGS. 11A and 11B are perspective views showing different configurations of the support portion that composes the lens-mounting structure according to the second embodiment of the present invention. Elements in these drawings that are the same as those shown in FIGS. 3-6 have the same symbols. Therefore, descriptions of those elements will be omitted from the description below.

With the second embodiment, two support portions 51 are composed as one cylindrical projection. Three round holes 54 are formed in each mounting surface 51a of each support portion 51. In this way, by forming three round holes 54 in the mounting surface 51a of each support portion 51, in the same way as described the first embodiment, the gluing surface area (S–S') of the mounting surfaces 51a (excluding the three round holes 54) of each support portion 51 and adhesive agent 52 is set to be smaller than the gluing surface area (shaded surface area S in FIG. 10) of the lens 33 and adhesive agent 52 ((S–S')<S).

Also, with the second embodiment, the sum of the peripheral length of each round hole 54 formed in the mounting surface 51a of the support portion 51 is set to be at least ½ of the outer peripheral length of the gluing surface of the lens 33 and adhesive agent 52. More specifically, if the peripheral length of each round hole 54 is a1, and the outer peripheral length (outer peripheral length of the support portion 51) is a, the following relationship is established.

$$3 \times a1 \geq a/2 \quad (2)$$

Note that as another configuration that satisfies the above relationship (2), it is acceptable to adopt a configuration that forms three round holes 54 of the mounting surface 51a of the support portions 51 composed of prismatic projections as shown in FIG. 11A, or to adopt a configuration that forms three square holes 55 in the mounting surfaces 51a of the support portion 51 composed of cylindrical projections as shown in FIG. 11B.

Also, with this embodiment, the gluing surface area of the adhesive agent 52 and mounting surface 51a of the support portion 51 described above is set to be smaller than the gluing surface area of the adhesive agent 52 and lens 33, and the sum of the peripheral length of each round hole 54 formed in the mounting surface 51a of the support portion 51 is set to be at least ½ of the outer peripheral length of the gluing surface of the lens 33 and adhesive agent 52. For that reason, stress is reduced that developed near the mounting surface 51a of each support portion 51 of the lens 33 caused by shrinkage associated with hardening of the adhesive agent 52. Also, localized refractive index changes of the lens 33 and orientation changes of the lens 33 caused by optical elasticity are effectively prevented and high-optical characteristics of the lens 33 are ensured. The result is that problems such as localized changes in the light beam imaging position on the photosensitive drums 2a, 2b (see FIG. 1) using the optical-scanning apparatus 13 shown in FIG. 2 do not occur, and high-precision optical scanning of photosensitive drums 2a, 2b is possible. For that reason, problems such as an image being out of color registration do not occur in the color-laser printer shown in FIG. 1 that is equipped with two of such optical-scanning apparatuses 13, and high-quality full-color images can be obtained in a stable manner.

Figure 12:
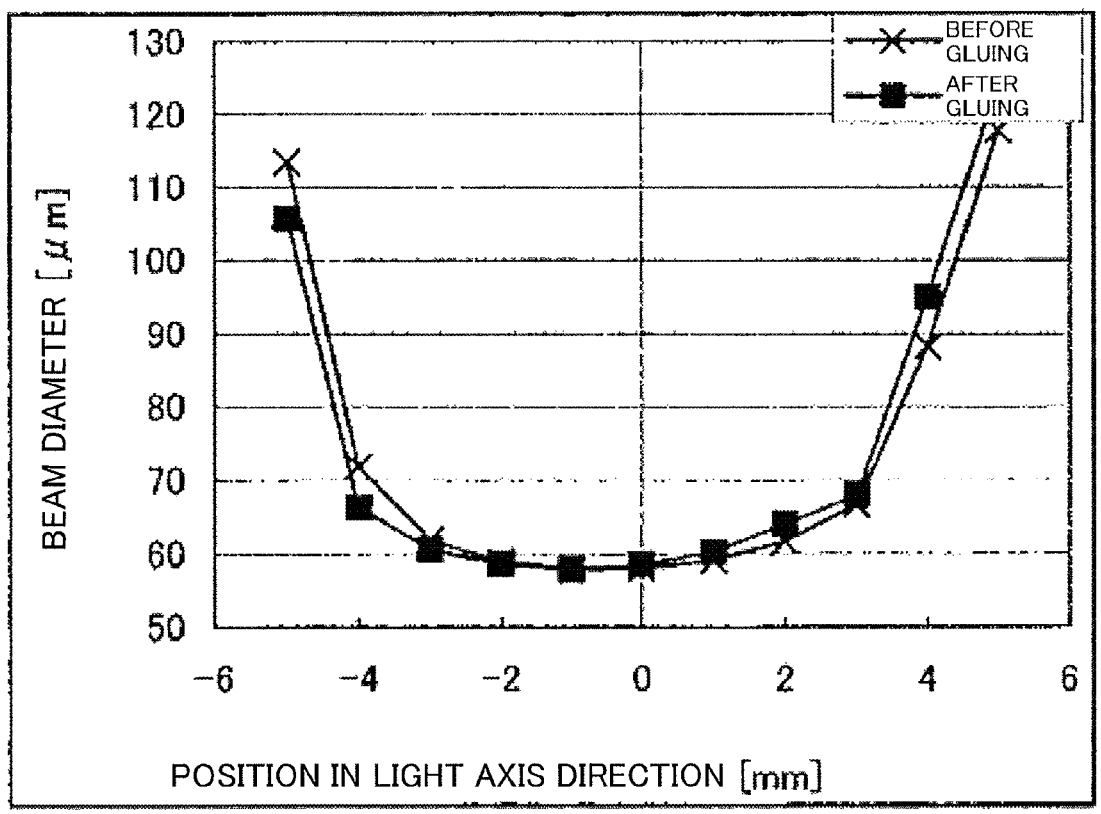
FIG. 12 is a graph showing changes of a light beam diameter that passes near a lens base level, in a lens-mounting structure according to the second embodiment of the present invention, in an light axis direction position.

Here, FIG. 12 is a graph showing changes in an light beam diameter [μm], before and after gluing, that passes near a base level of the lens 33, when the sum of the peripheral length of each round hole 54 formed in the mounting surface 51a of each support portion 51, and outer peripheral length of the gluing surface of the lens 33 and adhesive agent 52 are equal, with regard to an light axis direction position [mm]; According to results shown in FIG. 12, it is clear that stress caused to the lens 33 by adhesive 52 hardening and shrinkage is adequately reduced, and that no changes develop in the imaging position before and after the lens is glued.

The description of the present invention above related to an embodiment that is adopted for a first-imaging lens mounting structure in color-laser printer, and an optical-scanning apparatus equipped with the same, and an optical-scanning apparatus. However, the description is not to be construed as a limitation of the present invention. The present invention can also be applied to a lens-mounting structure equipped on any other color image forming apparatus, optical-scanning apparatus equipped with the same, and the optical-scanning apparatus described above. Furthermore, the present invention can also be applied to a lens-mounting structure equipped on any apparatus other than an optical-scanning apparatus.

What is claimed is:

1. A lens mounting structure comprising:
a first projection configured to position a lens;
a second projection which has a height set to be lower than a height of the first projection including a mounting surface configured to support the lens;
an adhesive applied between the lens and the second projection,
wherein the adhesive has one surface facing the second projection and the other surface facing the lens, the one surface and the other surface each having a substantially same area,
wherein a part of the one surface is configured to be one bonding surface between the adhesive and the mounting surface and a substantially entirety of the other surface is configured to be the other bonding surface between the adhesive and the lens,
wherein a plurality of holes is recessed into the mounting surface of the second projection, and
wherein a sum of peripheral lengths of the holes recessed into the mounting surface of the second projection is configured to be at least ½ of an outer peripheral length of the other bonding surface facing the lens.

2. An optical-scanning apparatus comprising the lens mounting structure according to claim 1.

3. An image-forming apparatus comprising the optical-scanning apparatus according to claim 2.

4. The lens mounting structure according to claim 1, wherein a number of the first projection is three.

* * * * *